(12) United States Patent
Theppasandra et al.

(10) Patent No.: US 6,473,615 B1
(45) Date of Patent: Oct. 29, 2002

(54) SELECTIVE CALL NOTIFICATION IN A WIRELESS NETWORK

(75) Inventors: Janardhan Theppasandra, Dallas, TX (US); Leif Linde, Richardson, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/316,465

(22) Filed: May 21, 1999

(51) Int. Cl.[7] .................................................. H04Q 7/20
(52) U.S. Cl. ........................ 455/445; 455/433; 455/417
(58) Field of Search .................................. 455/414, 417, 455/422, 433, 445, 461; 379/201.06, 201.07, 201.08, 201.09, 201.1, 207.13

(56) References Cited

U.S. PATENT DOCUMENTS 5,406,616 A * 4/1995 Bjorndahl ................... 455/433
5,995,848 A * 11/1999 Nguyen ...................... 455/528
6,154,644 A * 11/2000 Murray ....................... 455/414

* cited by examiner

*Primary Examiner*—Vivian Chin
*Assistant Examiner*—James K. Moore
(74) *Attorney, Agent, or Firm*—Jenkens & Gilchrist, P.C.

(57) ABSTRACT

A selective call notification feature in a communication system (100) with a distributed processor (110), a telephonic device (118), and another telephonic device (124) having a telephonic identification code. A selective call notification process at the distributed processor (110) provides for the sending of a signal through the communication system (100) to the telephonic device (118) in response to the other telephonic device (124) being available to receive calls.

14 Claims, 8 Drawing Sheets

SELECTIVE CALL NOTIFICATION IN A WIRELESS NETWORK

TECHNICAL FIELD

The present invention relates generally to telephonic communication systems and, in particular, to a call notification system in a wireless intelligent network.

BACKGROUND OF THE INVENTION

Wireless networks have evolved beyond switches and base stations that make connections between mobile telephones and telephones located in wireless or land networks. The current wireless networks that are deployed around the world are considered to be wireless intelligent networks. Intelligent networks have switches and base stations, but may also contain distributed processors such as home location registers, visitor location registers, and service control points.

An example of a wireless intelligent network architecture is the Global System for Mobile Communications (GSM) deployed in Europe, Australia, and the Middle East by various manufactures of mobile telephonic equipment. The architecture of a wireless intelligent network allows data to be stored and shared between intelligent network devices while shifting processing from the switch to other intelligent devices such as the service control points.

A common feature implemented on a service control point in a wireless intelligent network is voice mail. When an originating telephonic device attempts to call a terminating telephonic device and the caller is unavailable, the originating telephonic device can send a voice message for recording and later retrieval by the terminating telephonic device if the terminating telephonic device has the voice mail feature. At a later time, the terminating telephonic device transmits a voice mail access number entered by the user to the service control point for retrieval of the stored messages. A problem with the voice mail system is the terminating telephonic device does not know if any new voice mail messages have been left without entering the access number. Furthermore, if voice mail has been recorded, each of the messages must be played by the user in order to determine who recorded each message. This often can be a very time consuming task.

Some voice mail systems have voice mail indicators to allow voice mail subscribers to be informed that new voice mail is waiting. The voice mail indicators are often implemented on a mobile telephone as a light to signal waiting voice mail messages or if the mobile telephone has an alphanumeric display, by displaying a text message. Even with the use of voice mail indicators, the problem still exists of not being able to determine who has sent and left voice mail messages until the messages are retrieved.

Another feature that exists in wireless intelligent networks is the ability of the terminating telephonic device to automatically call back the last originating telephone number received. An example of an automatic callback feature is *69 in the public switch telephone network (PSTN). The problem with this feature is it only allows a called telephonic device to call back the last call received. Moreover, if the terminating telephonic device was busy when called, the originating telephone number would not be stored. Additionally, the callback feature exists only for PSTN to PSTN calls and has not been implemented in wireless intelligent networks.

In addition to voice mail and automatic callback features, Caller ID exists in wireless intelligent networks. Caller ID allows specially equipped telephonic devices to scan a list of callers. The list of callers usually contains the telephone number of the caller and often includes additional information such as the name of the caller. The Caller ID feature is limited because the terminating telephonic device must be powered on to receive data associated with the caller.

Thus a need exists for a called telephonic device to be selectively notified of previously unsuccessful call attempts by other telephonic devices to the called telephonic device. Additionally, a need exists for notifying a called telephonic device, that an originating telephonic device which had previously unsuccessfully attempted to establish a call connection with the called telephonic device is now powered on and able to receive a return call from the called telephonic device.

SUMMARY OF THE INVENTION

The present invention is directed to a system and method for selective call notification in a wireless intelligent network that resolves the above noted problems of conventional communication systems.

The implementation of the selective call notification process is on an intelligent network device and makes use of data contained at a home location register to selectively notify a telephonic device of the availability of another telephonic device. The selective call notification can be activated by an activation code at the telephonic device or by the telephonic device making an unsuccessful call attempt.

A mobile telephone user activates the selective call notification feature at the mobile telephone by entering the activation code and the telephone numbers of other telephones from which calls are expected. The mobile telephone is then notified by the selective call notification feature if any unsuccessful call attempts were detected from the entered telephone numbers while the mobile telephone was busy or powered off. Additionally, the user is able to activate the call notification feature upon an unsuccessful call attempt to another mobile telephone. The selective call notification feature then notifies the user when both mobile telephones are powered on and able to receive telephone calls.

BRIEF DESCRIPTION OF THE DRAWINGS

Other aspects of the invention including specific embodiments are understood by reference to the following detailed description taken in conjunction with the intended drawings in which.

DETAILED DESCRIPTION OF PREFERRED EMBODIMENT

Figure 1:
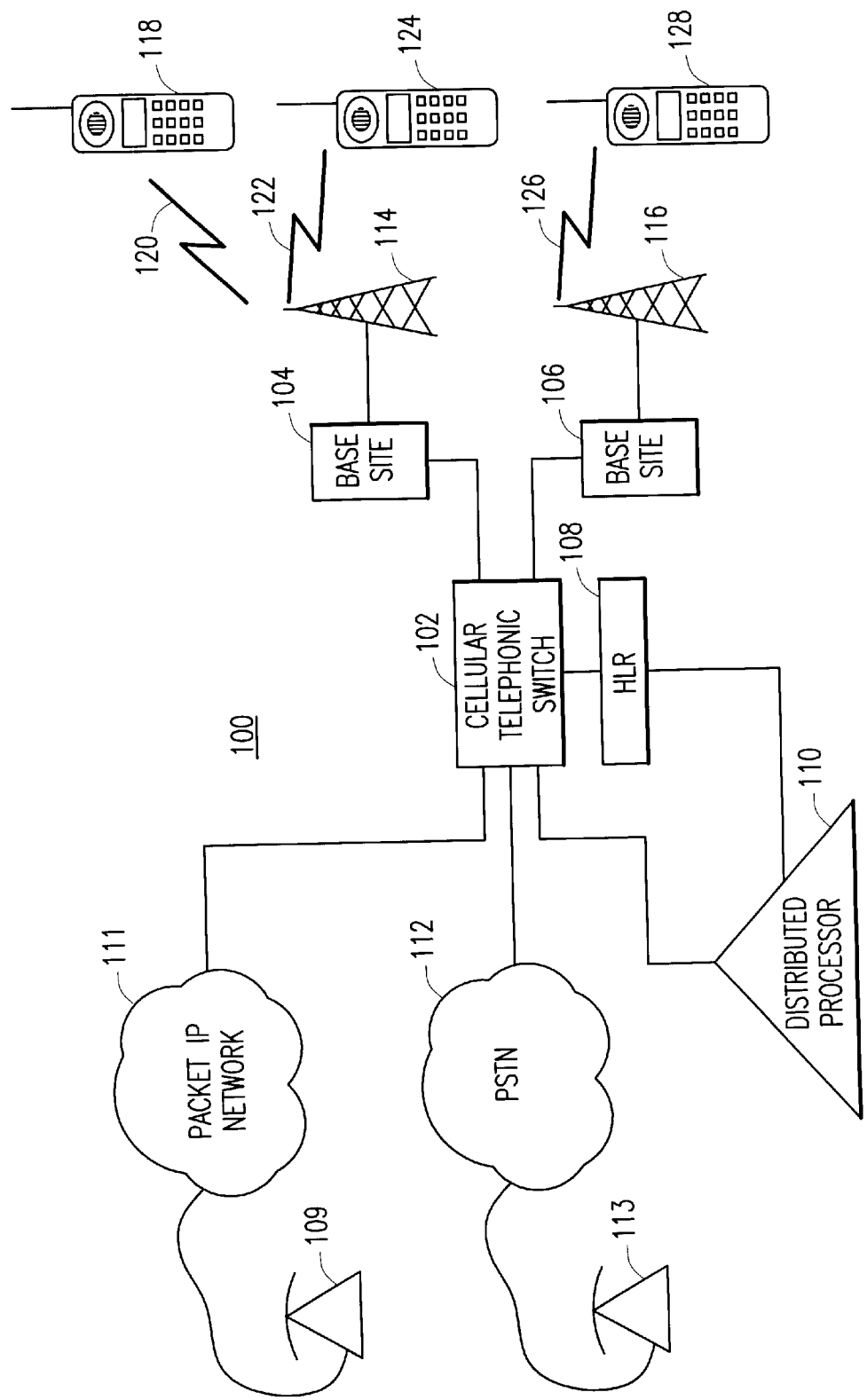
FIG. 1 is an illustrative diagram of a communication system having a cellular telephonic switch with a distributed processor arrangement in accordance with an embodiment of the invention.

Referring now to FIG. 1, a communication system 100 having a cellular telephonic switch 102, coupled to base sites 104, 106 is shown. The cellular telephonic switch 102 is coupled to a home location register (HLR) 108, a distributed processor 110, packet internet protocol (IP) network 111, and public switch telephone network (PSTN)112. The PSTN network 112 is coupled to a PSTN telephonic device 113. The packet IP network 111 is coupled to an IP telephonic unit 109. As seen in FIG. 1, base site 104 is coupled to the cellular telephonic switch 102 and an antenna 114. Similarly, base site 106 is coupled to the cellular telephonic switch 102 and another antenna 116. The antenna 114 connects to a telephonic device 118 over a wireless communication path 120 and to another telephonic device 124 over another wireless communication path 122. As seen in FIG. 1, antenna 116 communicates to telephonic device 128 over another wireless communication path 126. The HLR 108 is also coupled to the cellular telephonic switch 102 and the distributed processor 110.

During usage, the telephonic devices 118, 124, 128 in the communication system 100 may selectively be in one of various communication states such as: the powered on idle state, the powered on busy state, or the powered off state. If the telephonic devices 118, 124, 128 are powered off, the powered off state is recorded at the home location register (HLR) 108 for the respective telephonic device 118, 124, 128. If the telephonic devices are powered on idle, the HLR 108 records the powered on idle state for the respective telephonic device 118, 124, 128. Likewise, if the telephonic devices are powered on and busy, the HLR 108 records the power on busy state for each of the respective telephonic devices 118, 124, 128.

Figure 8:
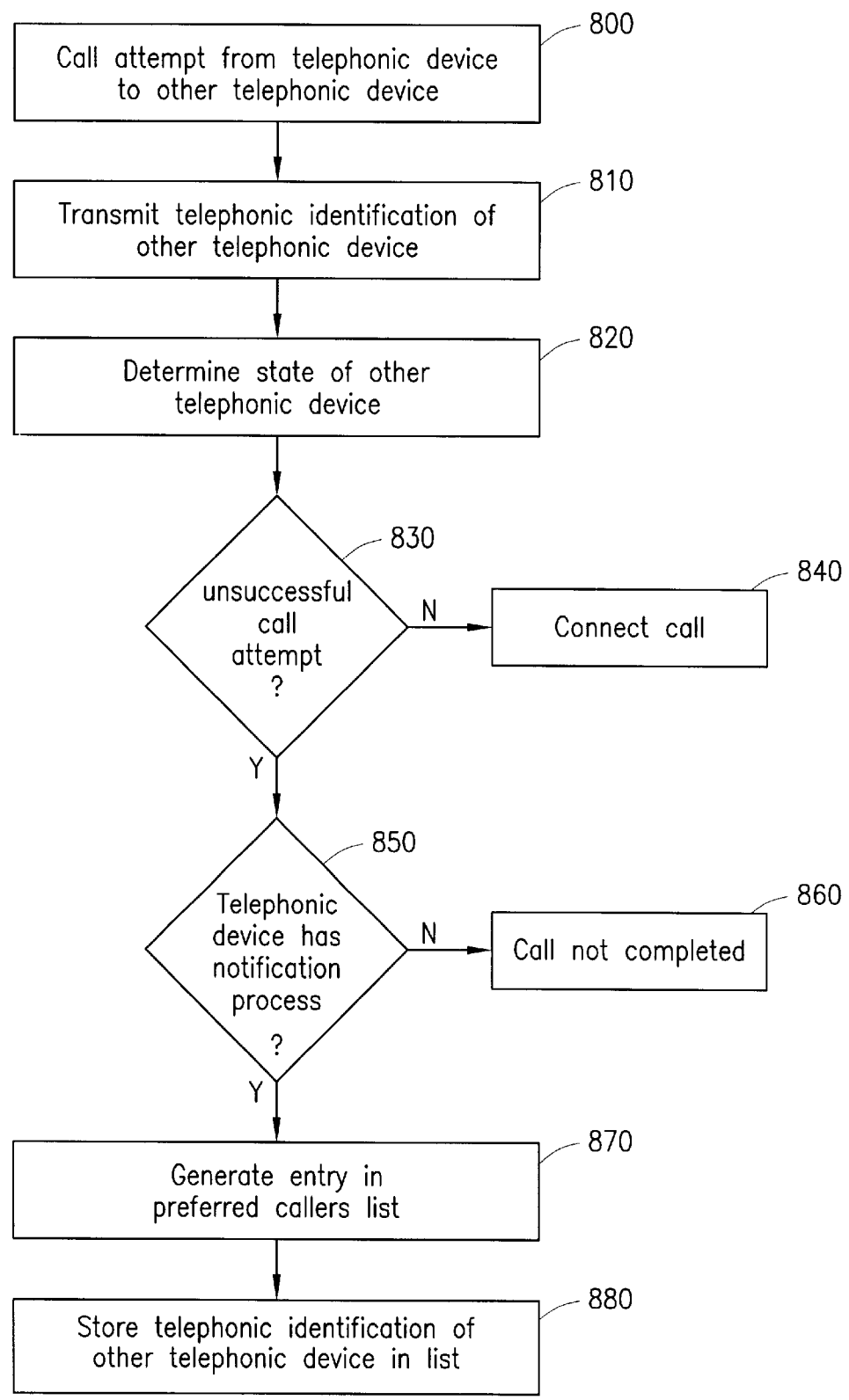
FIG. 8 is a flow chart of a method for entering telephonic identification codes into a preferred callers list, in accordance with an embodiment of the present invention.

In one aspect of the present invention, as shown in FIG. 8, which will be described in connection with FIG. 1, telephonic device 118 acting as a calling telephonic device in the powered on busy state attempts to make a call at step 800, FIG. 8. In step 810, FIG. 8, the calling telephonic device 118 transmits the telephonic identification code of another telephonic device 128 (referred to as the called telephonic device) to the antenna 114 over the wireless communication path 120. The signal is then received by the base site 104 from the antenna 114 and is transmitted to the cellular telephonic switch 102. The cellular telephonic switch 102 receives the telephonic identification code of the called telephonic device 128 from the base site 104. The cellular telephonic switch 102 then determines if it is a wireless telephonic device or a PSTN/IP telephonic device by translating the telephonic identification code into routing information. The determination of a PSTN/IP called telephonic device can selectively be done at the cellular telephonic switch 102 or the HLR 108 with the cellular telephonic switch 102 being preferred.

Based on the routing information, if the cellular telephonic switch 102 determines that the called telephonic device 128 is not a PSTN/IP telephonic device, it then signals the HLR 108 with the telephonic identification code. The HLR 108 contains a database of the states of the telephonic devices 118, 124, 128 located in the intelligent network. In step 820, FIG. 8, the HLR 108 determines the state of the telephonic device 128 and sends a status report containing the state information to the cellular telephonic switch 102. At step 830, FIG. 8, if the called telephonic device 128 is in the powered on busy state or the powered off state, the cellular telephonic switch 102 determines if the calling telephonic device 118 has an associated selective call notification process at step 850, FIG. 8. Otherwise, the call is connected to the telephonic device 128 at step 840, FIG. 8. If the telephonic device 118 has the selective call notification process, the cellular telephonic switch 102 signals the selective call notification process running on the distributed processor 110 that the telephonic devices 128 and 118 are available to be connected. Otherwise, in step 860, FIG. 8, the call is not completed.

The selective call notification process at the distributed processor 110 provides a preferred callers list for every telephonic device in the calling area that has the selective call notification feature. In step 870, FIG. 8, the selective call notification process generates an entry in the preferred callers list associated with the telephonic device 118 to be notified and at step 880, FIG. 8, places into the entry the telephonic identification code (such as the telephone number) of the called telephonic device 128 and a record number. Examples of additional information that are enabled to be stored in the record are: Time record received, subscriber identification, location number, visitor location number, geographical information, network id, and Internet Protocol number.

The selective call notification process also provides a prompt to the telephonic device 118 through the communication system 100 for a notification time period to be entered by the user. In response to the prompt for a notification time period from the selective call notification process, the telephonic device 118 may selectively cancel call notification for this telephonic identification code, accept a default notification time period, or enter a notification time period. If the user at the calling telephonic device 118 accepts the default notification time period or enters the notification time period, a timer value is transmitted through the communication system 100 to the selective call notification process at the distributed processor 110 and stored in the record with the telephonic identification code for the called telephonic device 128. The selective call notification process then sets a timer for the notification time period at the distributed processor. Otherwise, the record for the called telephonic device 128 is removed from the preferred callers list by the selective call notification process at the distributed processor 110.

At predetermined intervals the distributed processor 110 signals to the HLR 108 with telephonic identifications such as a telephone number or an electronic serial number (ESN) of telephones which were stored at the preferred callers list. The HLR 108 responds with the respective state for the telephonic identifications and the state of the telephonic device 118 associated with the preferred callers list. For example, a preferred callers list for a mobile telephone "A" may contain the telephonic identification code for mobile telephones "C" and "D" and the HLR when queried would respond with the states of mobiles "A", "C", and "D". Upon the selective call notification process determining that both the calling telephonic device 118 and the called telephonic device 128 are available, a notification is sent to the calling telephonic device 118 along with a prompt to set up a call to the called telephonic device 128. The user of telephonic device 118 can respond to the prompt by having the call set up, clearing the called telephonic device 128 from the preferred callers list, or setting the notification timer again.

If the telephonic device 118 response to the selective call notification process is to set up the call, the selective call notification process then sends the telephonic identification code (such as a the telephone number) of the called telephonic device 128 to the cellular telephonic switch 102. The cellular telephonic switch 102 then initiates a connection between telephonic device 118 and telephonic device 128. Upon successful set up of the communication path through the communication system 100, the selective call notification process removes the record for the called telephonic device 128 stored at the distributed processor 110 from the preferred callers list associated with the telephonic device 118.

As seen in FIG. 1, the called telephonic device 128 is located in a different area (e.g. roaming within a cellular network) of the communication system 100, and is signaling with a different base site 106 than that of telephonic device 118. Telephonic device 118 communicates to antenna 114 over the wireless communication path 120 to base site 104 and cellular telephonic switch 102. Unlike the called telephonic device 128, the other telephonic device 124 is located in the same network area as the telephonic device 118. The cellular telephonic switch 102 connects with the other telephonic device 124 through base site 104, antenna 114, and wireless communication path 122, rather than the other base site 106 and the other antenna 116. However, if telephonic device 128 is located in the same network area as telephonic device 118, the selective call notification process actions are similar to the actions described above.

Figure 9:
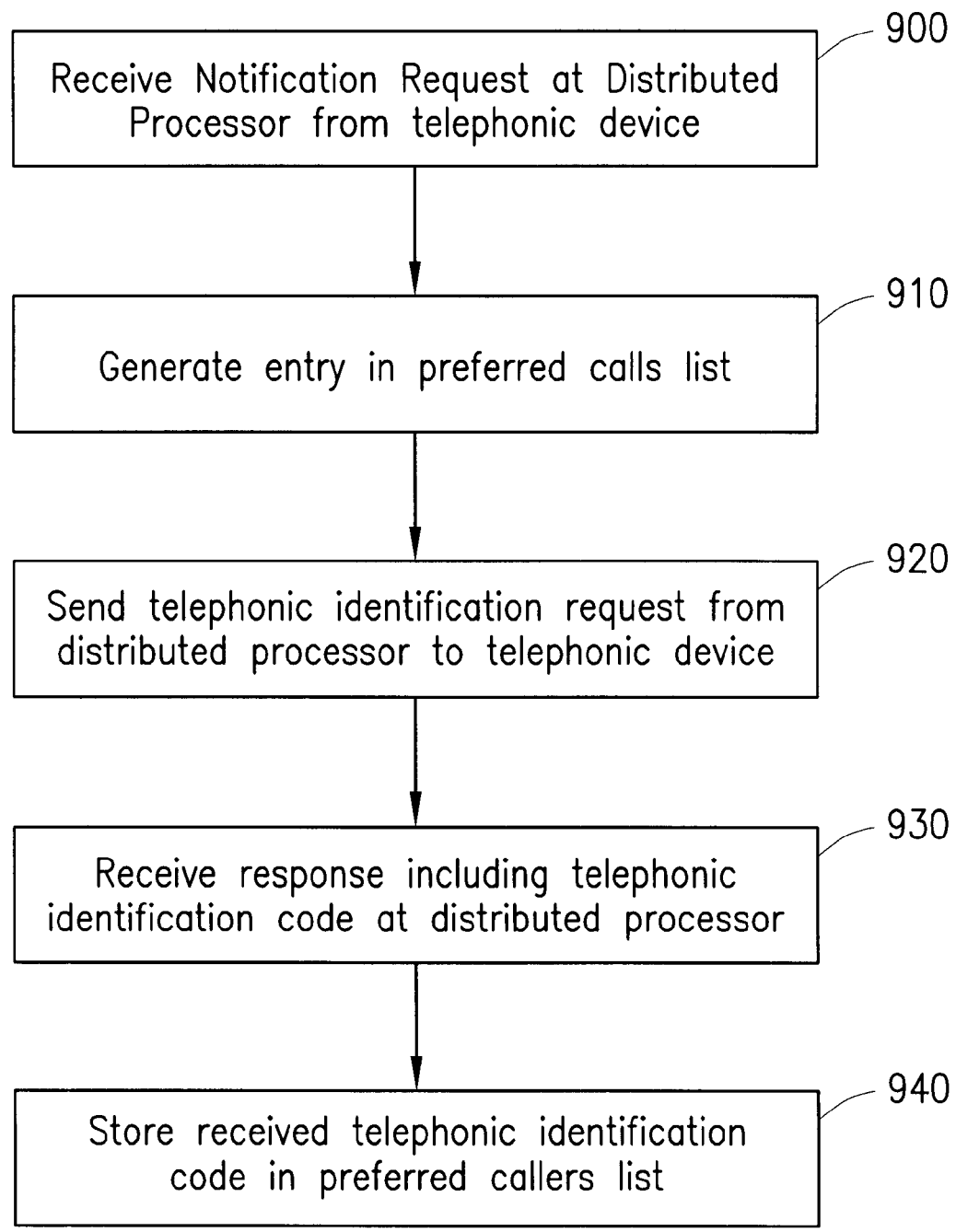
FIG. 9 is a flow chart of an alternate method for entering telephonic identification codes into a preferred callers list, in accordance with another embodiment of the present invention.

With reference now to FIG. 9, which will be described in connection with FIG. 1, the present invention may also be applied when a user of telephonic device 118 activates the selective call notification process by entering an activation code (notification request signal) using a keypad of the telephonic device 118. In step 900, FIG. 9, the activation code is transmitted through the communication system 100 to the selective call notification processor at the distributed processor 110.

In step 910, FIG. 9, the selective call notification process generates an entry with a record number in the preferred callers list for the telephonic device 118 to be notified. In step 920, FIG. 9, the distributed processor then prompts the user of the telephonic device 118 through the communication system 100 to enter telephonic identification code information, such as a telephone number of the other mobile telephone 128. In step 930, FIG. 9, once the user using the telephonic device 118 sends a response with a telephonic identification code, at step 940, FIG. 9, the telephonic identification code is placed into the preferred callers list record. A timer value is also entered into the record with a default value being preferred, but the user at telephonic device 118 may selectively enter a desired time duration for notification.

The telephonic device 118 is notified of unsuccessful call attempts from the other mobile telephonic devices 124, 128, the IP telephonic device 109, or the PSTN telephonic device 113 if the respective telephonic identification code for the devices appears in the preferred callers list. If the telephonic device 124, unsuccessfully attempts to call telephonic unit 118 the cellular telephonic switch 102 will determine if the telephonic device 118 employs the selective call notification process and if so, signals the selective call notification process at the distributed processor 110. The selective call notification process checks the preferred callers list associated with the telephonic device 118 for the telephonic identification code of the calling telephonic device 124. If the calling telephonic device 124 is referenced in the preferred callers list record and is not a PSTN/IP telephonic device, the selective call notification process starts signaling the HLR 108 for the status report for both telephonic devices 118, 124.

When the selective call notification process determines from the HLR reports that both telephonic devices 118, 124 are in the powered on idle state, a message is sent through the cellular telephonic switch 102 from the selective call notification process at the distributed processor 110 to the telephonic device 118 associated with the preferred callers list. The user of telephonic device 118 is prompted by the message to set up a call to the other telephonic device 124. The user of telephonic device 118 via the switch 102 can respond to the prompt by having the call set up, clearing the record of the other telephonic device from the preferred callers list, or setting the notification timer.

If the preferred callers list contains a telephonic identification code for an IP telephonic device 109 or PSTN telephonic device 113 as determined by the to cellular telephonic switch 102, the HLR 108 is not signaled for state information about the telephonic devices 109 or 113. The selective call notification process is notified by the cellular telephonic switch 102 of the telephonic identification code of the telephonic devices 109 or 113 that made the unsuccessful call attempt to the telephonic device 118. The cellular telephonic switch 102 then determines that the telephonic device 118 has the selective call notification process active. Unlike the processing for called mobile telephones, the selective call notification process at the distributed processor 110 only signals the HLR 108 with the identification of the telephonic device 118 associated with the preferred callers list. A prompt is sent to the user of telephonic device 118 to set up a call when the selective call notification process receives the HLR status report indicating the telephonic device 118 is in the powered on idle state. In the preferred embodiment, the HLR 108 does not have a record for the IP telephonic device 109 or PSTN telephonic device 113. Therefore, the distributed processor 110 assumes the telephonic device 109 and 113 to be in the powered on idle state by default.

Figures 2, 3:
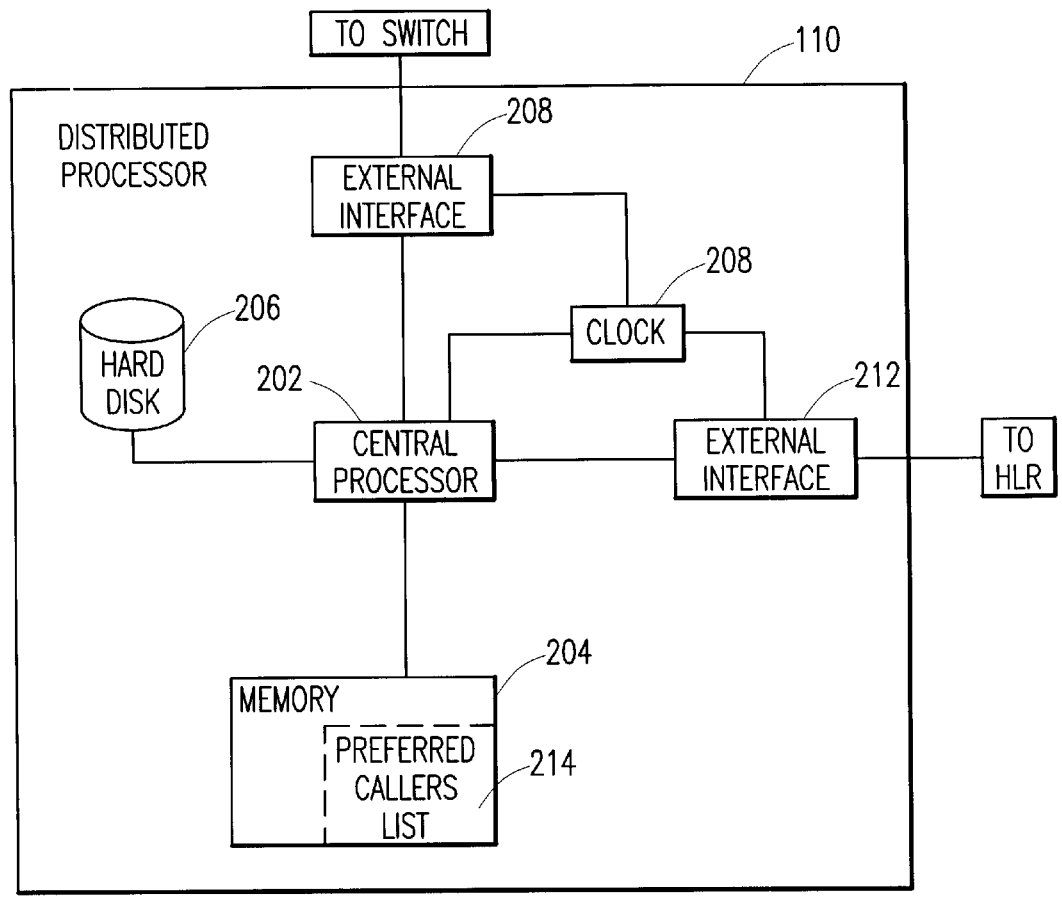
FIG. 2 shows a block diagram of a distributed processor in accordance with an embodiment of the invention.
FIG. 3 shows a preferred callers list for a particular telephonic device stored at the distributed processor in accordance with an embodiment of the invention.

Turning to FIG. 2, the distributed processor 110 is an intelligent network device and is preferably a service control point. The distributed processor 110 has a central processor 202 coupled to a memory 204, a hard disk drive 206, an external interface 208 to the switch 102, FIG. 1, a clock 210, FIG. 2, and an external interface 212 to the HLR 108, FIG. 1. The memory 204, FIG. 2, of the central processor 202 has a database containing a preferred callers list 214 for each subscriber having the selective call notification feature. The clock 210 is coupled to the central processor 202 and the external interfaces 208, 212.

The distributed processor 110 is controlled by the central processor 202. The central processor 202 is preferably an individual microprocessor or multiple application specific integrated circuits (ASIC) and multiple microprocessors functioning together as a central processor. The central processor 202 receives timing from the clock 210 which enables the central processor 202 to receive and process data. The central processor 202 transmits and receives data from the telephonic switch 102, FIG. 1, through the external interface 208, FIG. 2. If the data received from the switch 102, FIG. 1, is for the preferred callers list 214, FIG. 2, the central processor 202 moves the data from the external interface 208 to the memory 204 and specifically to the proper record in the preferred callers list 214 in the memory 204.

The central processor 202 at predetermined intervals sends a status request message to the external interface 212 to be sent to the HLR 108, FIG. 1. Preferably, status request messages typically are sent approximately every five minutes. The status request message contains telephonic identification codes, such as telephone numbers, from the preferred callers list. The distributed processor 110 then receives a status report containing the state information for each of the telephonic identification codes sent to the HLR 108. The central processor 202, FIG. 2, then determines from the received state information if the telephonic devices 118, 124 are in the powered on idle state. The central processor 202 notifies the telephonic device 118, FIG. 1, when the mobile telephonic device 124, from the preferred callers list, and the mobile telephonic device 118 associated with the preferred mobile callers list are both in the powered on idle state in order that a call can be set up between the mobile telephonic devices 118, 124. The call notification message is sent from the distributed processor 110 through the external interface 208 to the switch 102, FIG. 1. The switch 102 then sends the call notification through the communication system 100 to the telephonic device 118.

The clock 210 is preferably slaved to (in synchronization with) a clock signal received at the external interface 208, or 212. The clock 210 may alternatively be free running using an oscillator. The clock 210 is used to properly synchronize the interfaces 208, 212 and central processor 204 and enables data to be moved between components within the distributed processor 110. The hard disk 206 is a type of permanent memory to backup the preferred callers list 214 and other critical programs that could be lost if power was removed from the distributed processor 110.

FIG. 3 is an individual preferred callers list format 300 that is associated with a telephonic mobile device, such as mobile telephonic device 118, FIG. 1, and stored in the preferred callers list memory 214, FIG. 2, in accordance with the present invention. The list contains an intelligent network subscriber identification 302 such as the telephonic identification code of the telephonic device, such as mobile telephonic device 118, FIG. 1, associated with the preferred callers list 300, FIG. 3. A record 304 in the preferred callers list 300 contains multiple data fields with record number, telephonic identification code, time in, timer, and automatic/manual being preferred. Additionally, the record 304 in the preferred callers list 300 may selectively contain data fields such as: record number, caller identification, time in, date, caller number, IN subscriber identification, HLR number, visitor location register number, geographical information, network identification, Internet protocol number for Internet telephones, queue process active, etc.

The record number 306, FIG. 3, identifies how many call notification records 304 are in the preferred callers list 300. The telephonic identification code 308 contains the telephonic identification of the telephonic device 124, FIG. 1, that is monitored by the notify process. The time-in field 310, FIG. 3, contains the date and time that the record 304 was created in the preferred callers list 300. A timer value 312 is preferably set in minutes but alternatively can be set in hours, days, or seconds. If no value is entered when the record 304 is created, a default value is used, preferably being 30 minutes. The last field of the record 304 is the Automatic/Manual (A/M) field 314 and signifies if the record was created automatically as the result of an unsuccessful call or if a user entered the information into the record 304 manually from the telephonic device associated with the preferred callers list 300.

Figure 4:
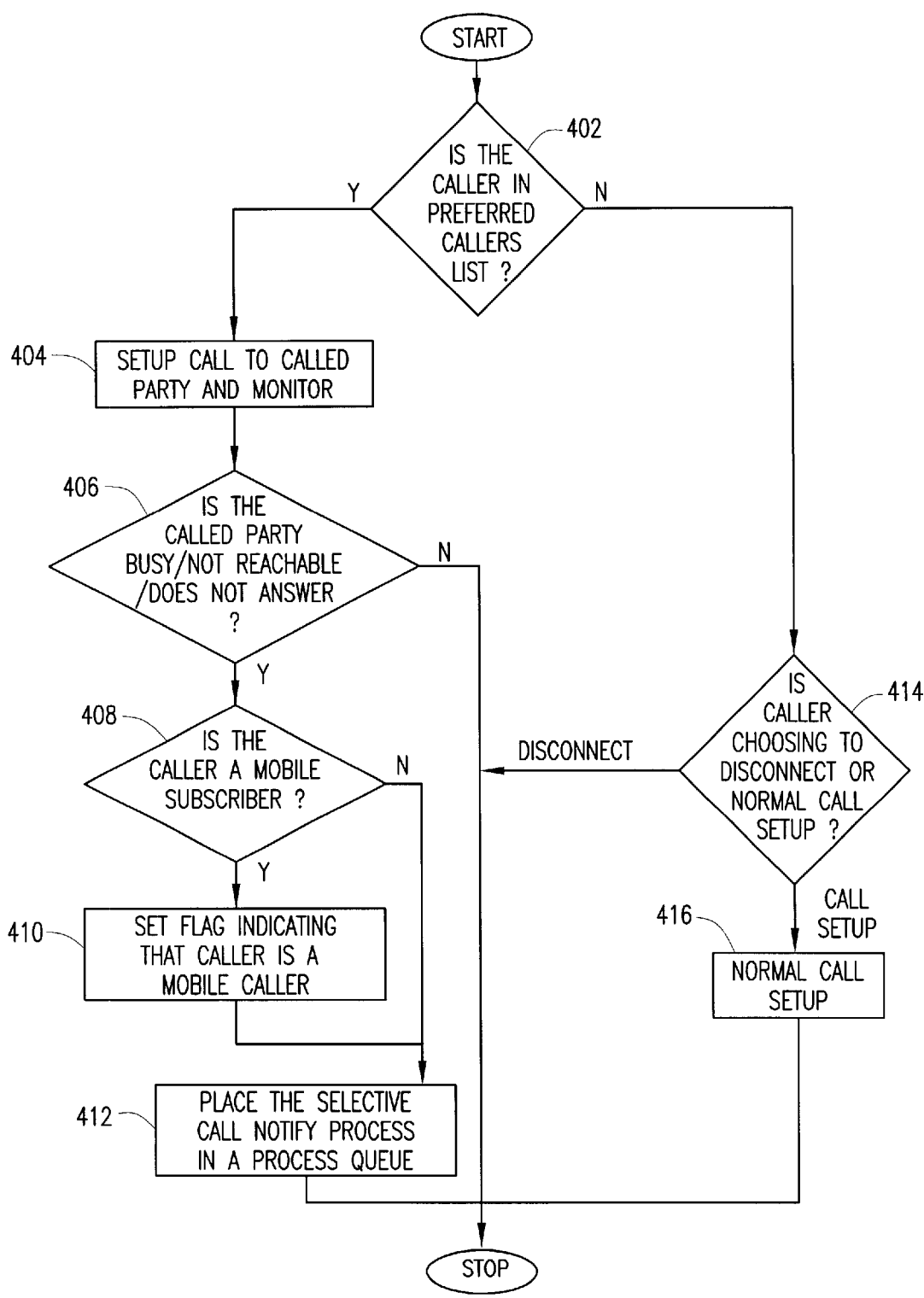
FIG. 4 is a flow chart of a method of selective call notification activation with a called party having the telephonic identification code of the caller telephonic device in the preferred callers list in accordance with an embodiment of the present invention.

Referring now to FIG. 4, a flow chart is shown for the method steps of the selective call notification process at the distributed processor 110, FIG. 1, in accordance with the present invention. The called party communicates via the mobile telephone (e.g. telephonic device 118) using the selective call notification process. The selective call notification process, if activated, enables a called party to be notified of a call attempt made from a calling party. The called party has previously entered a form of telephonic identification such as the telephone number of the other mobile telephone (e.g. telephonic device 124) used by the caller into the preferred callers list located at the distributed processor 110. The caller using the other mobile telephone 124 then attempts to call the mobile telephone 118 having the selective call notification process. The called party is notified of the call attempt by the notify process (FIG. 5) when the called party and caller party (if a mobile telephone) are available and a call can be set up between the devices 118 and 124, FIG. 1. The steps include determining if the caller is in the preferred callers list; setting up a call to a called party; monitoring the call setup; determining if the called party is busy, not reachable, or does not answer; identifying if the caller is a mobile caller; setting a flag indicating that the caller is a mobile caller; placing the selective call notification process in a process queue; choosing to disconnect the call or to establish normal call setup; and establishing normal call setup.

In step 402, FIG. 4, the selective call notification process at the distributed processor 110, FIG. 1, determines if the telephone number of a caller is in the preferred callers list of the called party. The caller using a mobile telephone (e.g. telephonic device 124) or a PSTN telephone (e.g. PSTN telephonic device 113) attempts to call a called party. If the called party has the selective call notification process at the distributed processor 110, the selective call notification process determines if the received form of telephonic identification code (such as the telephone number) for the caller is in the preferred callers list. By placing the telephone number of the other mobile telephone 124 used by the caller in the preferred callers list the called party is notified of call attempts made by the caller. If the called telephonic device does not have a preferred callers list or does not have the selective call notification process activated then the processing moves to step 414, FIG. 4.

In step 404, FIG. 4, a call is set up to the called party at telephonic device 118, FIG. 1. The progress of the call setup is monitored at the switch 102 to determine if the call setup is successful. If the call setup to the called party at telephonic device 118 is completed and a successful call to the called party is made, then no other action is taken by the selective call notification process. In step 406, FIG. 4, the switch 102, FIG. 1, determines if the call setup is unsuccessful and if the called party (telephonic device 118) is busy, not reachable, or does not answer.

In step, 408, FIG. 4, the switch 102, FIG. 1, identifies if the caller is using a mobile telephone 124 or a PSTN telephone 113. The switch 102 is able to identify the caller device as a mobile telephone 124 or PSTN telephone 113 by processing the telephone number or other form of the telephonic identification code using translation and routing tables. If the caller device is a PSTN telephonic device, then the processing moves to step 412, FIG. 4. If the caller is using a mobile telephone 124, FIG. 1, then in step 410, FIG.

4, a flag is set in the preferred callers list record at the distributed processor 110, FIG. 1, to signify the existence of a mobile caller.

In step 412, FIG. 4, the selective call notification process for the called party is placed in the process queue. The selective call notification process places records of callers from the preferred callers list, who have attempted to call the mobile telephone 118, into the process queue. At periodic intervals the notify process (see FIG. 5) running on the distributed processor 110 checks if the mobile telephone 118 of the called party can receive notification of the attempted call by the caller.

If the telephonic identification code of the telephonic device used by the caller is not in the preferred callers list of the called party, then in step 414, FIG. 4, the caller can selectively choose to disconnect before call setup or proceed with the normal call setup. If normal call setup is selected then in step 416, a standard mobile telephone to mobile telephone call setup between telephonic devices 118 and 124, FIG. 1, is attempted.

Figure 5:
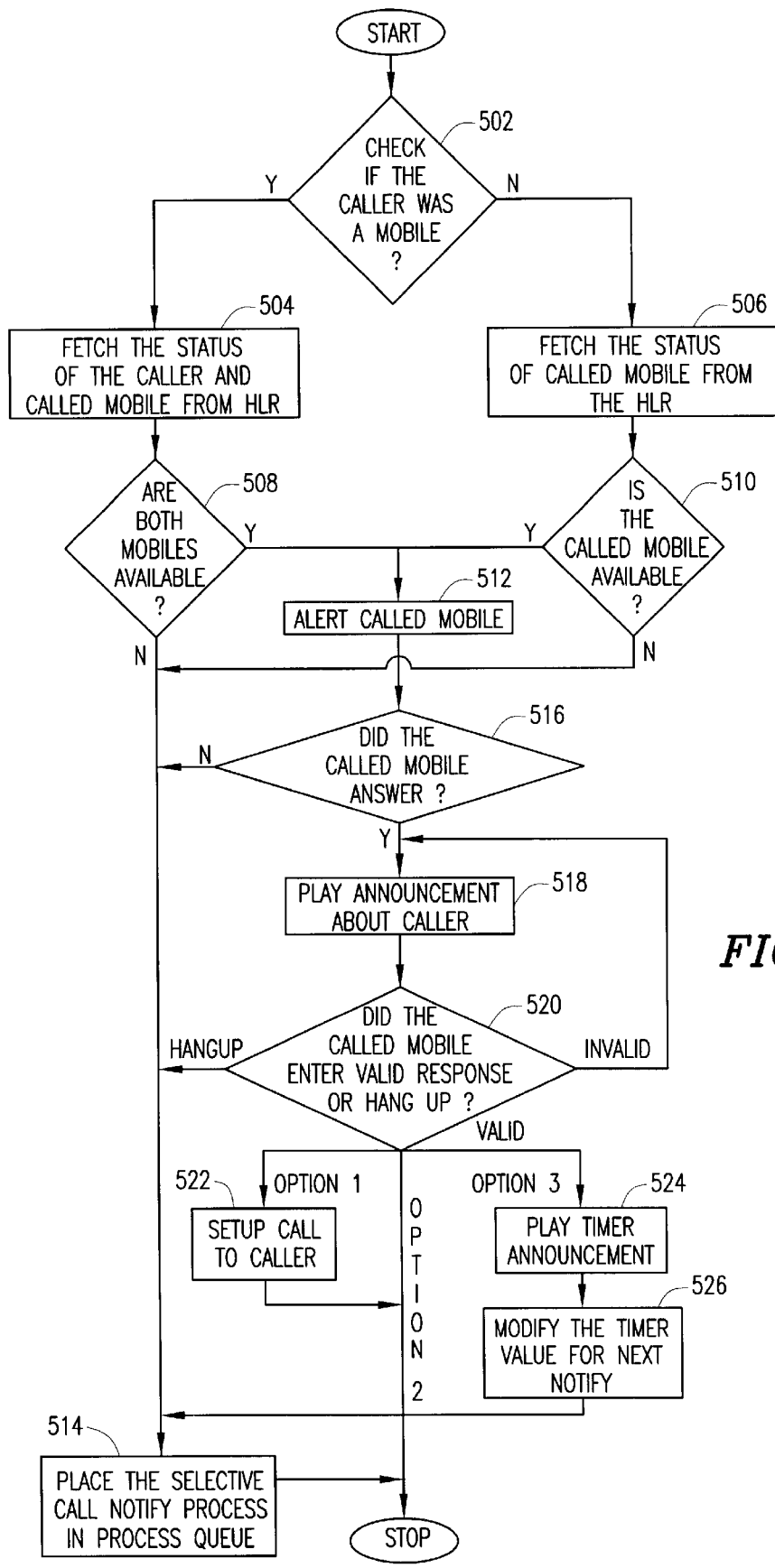
FIG. 5 is a flow chart of a notify process method in accordance with an embodiment of the present invention.

Turning to FIG. 5, a flow chart is shown for the method steps of the notify process on the distributed processor 110, FIG. 1. When executing the process, a mobile telephone 118 has a corresponding preferred callers list identifying a selected group of other telephonic devices within the list located at the distributed processor 110. The telephone number or other form of telephonic identification code for another telephone (such as mobile telephonic device 124, IP telephonic device 109, or PSTN telephonic device 113) had previously been stored into the preferred callers list of the mobile telephone 118. A caller using the other telephone (such as 109, 113 or 124) has attempted unsuccessfully to call the mobile telephone 118 and the caller activated the notify process for the mobile telephone 118. When the mobile telephone 118 becomes available, it will be notified by the notify process of the caller records from the preferred callers list that have been placed in the process queue. The called mobile telephone 118 will then know to call back the selected callers from the preferred callers list. If the caller was from a mobile telephone 124, the called telephone 118 will also know the mobile telephone used by the caller is in the powered on idle state ready to receive a call.

In step 502, FIG. 5, the notify process at the distributed processor 110, FIG. 1, checks if the previous caller, was using a mobile telephone. The information about the type of caller is preferably stored in the record contained in the preferred callers list. If the call was from a mobile telephone such as device 124, then in step 504, FIG. 5, the status of the caller mobile telephone 124, FIG. 1, and called mobile telephone 118 are fetched from the HLR 108. The status request is sent to the HLR 108 from the notify process at the distributed processor 110 and contains the telephonic identification codes for both the called and caller mobile telephones 118, 124. The HLR 108 responds to the request by sending a status report (e.g. telephonic device report) message to the notify process at the distributed processor 110 containing state information about the called and caller mobile telephones 118, 124.

In step 508, the processing determines if both mobile telephones are available. The notify process at the distributed processor 110, FIG. 1, processes the status report from the HLR 108 in order to determine when both mobile telephones are in the powered on idle state and able to be successfully connected. In step 512, FIG. 5, an alert is sent out to the called mobile telephone 118, FIG. 1, if both mobile telephones 118, 124 are in the powered on idle state and able to be connected successfully.

If the caller was from a PSTN telephone 113 then step 506, FIG. 5, the status of the called mobile telephone 118, FIG. 1, is fetched from the HLR 108. The fetching of the status of only the called mobile telephone 118 is similar to the fetching described above and the status report of the called mobile telephone 118 is also received by the notify process from the HLR 108. The notify process then processes the status report and determines if the called mobile telephone 118 is in the powered on idle state and available to receive calls. If the called mobile telephone 118 is in the powered on idle state, an alert is sent to the called mobile telephone in step 512, FIG. 5. If either of mobile telephones 118, 124, FIG. 1, are not available (step 508, FIG. 5) or if the called mobile telephone 118, FIG. 1, is not available (step 510, FIG. 5) then in step 514, the selective call notification process again places the record from the preferred callers list into the process queue.

In step 516, FIG. 5, the notify process at the distributed processor 110, FIG. 1, waits for an indication from the switch 102 that the called mobile telephone 118 answers in response to receiving the alert signal. If no answer is indicated to the notify process then the processing proceeds to step 514, FIG. 5, placing the record from the preferred callers list back into the process queue by the selective call notification process. If the mobile telephone 118, FIG. 1, answers, then in step 518, FIG. 5, an announcement about the caller is played. An example of the announcement, if the caller was a mobile telephone, is: "A caller at this <number> tried to reach you at <time>. The party is now free and please press '1' if you would like to have a call setup; '2' to drop the call or '3' to notify you again at a selected time". If the caller was a PSTN telephone then an example of the announcement is: "A caller at this <number> tried to reach you at <time>. Please press '1' if you would like me to set up a call; '2' to drop the call or '3' to notify you again at a selected time". It is understood that various other messages may be employed.

Step 520, FIG. 5, the response sent by the called mobile telephone 118, FIG. 1, is validated. For example the valid responses from the called mobile telephone 118 are '1', '2', '3', or hanging up. If the called party simply hangs the mobile telephone 118, FIG. 1 up, the selective call notification process again places the record from the preferred callers list into the process queue, step 514, FIG. 5. If the called mobile telephone 118, FIG. 1, response is not a valid response, the announcement about the caller mobile telephone 124 is replayed, step 518, FIG. 5. If an one for option '1' is received to set up a call, then the call to the caller mobile telephone 124, FIG. 1, is set up in step 522, FIG. 5. If a two or option '2' is received, then no call setup occurs and the selective call notification process for the called number is removed from the process queue. If a three for option '3' is received, an announcement for changing the time period for notification is played in step 524. The preferred timer announcement is: "Please enter in minutes the time to be notified after". Then in step 526, the timer value is received and the selective call notification process with the new timer value is placed in the process queue, step 514.

Figure 6:
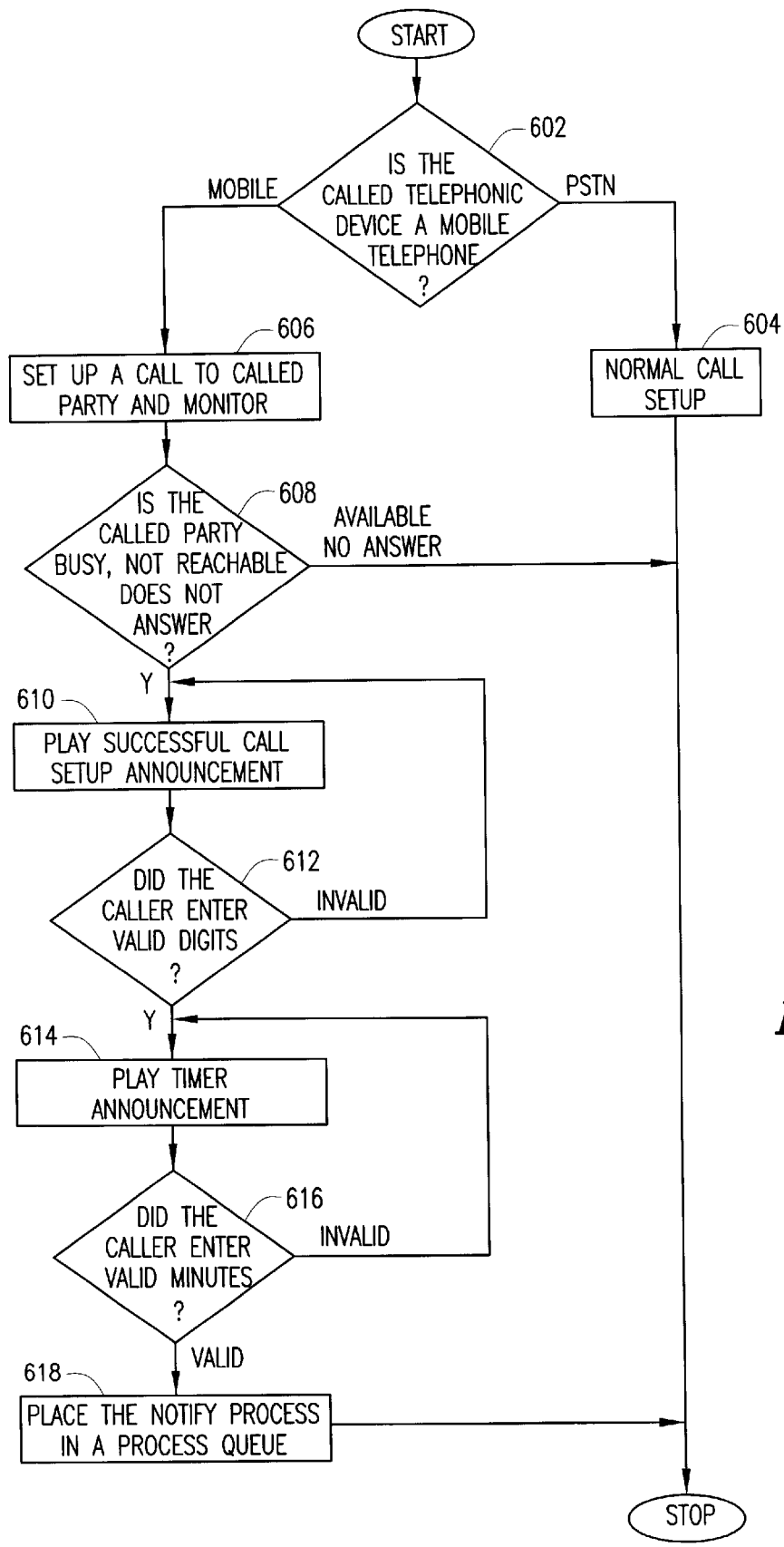
FIG. 6 is a flow chart of an alternate method of selective call notification activation at a calling telephonic device initiated by an unsuccessful call to a called mobile telephone in accordance with an embodiment of the present invention.

In FIG. 6, a flow chart for an alternate selective call notification process method of the invention is shown. The caller mobile telephone (e.g. telephonic device 118, FIG. 1) has the selective call notification process active on the distributed processor 110. The distributed processor 110 also has a preferred callers list associated with the caller mobile telephone 118. When the caller mobile telephone 118 attempts to call another mobile telephone (e.g. telephonic device 124) and the called mobile telephone 124 is not reachable, the caller selectively may choose to be notified when the called mobile telephone 124 becomes available. The caller also has an option to set a time period for caller notification. The preferred steps include: identifying if the called party is a mobile caller; setting up a call to a called party and monitoring the call setup; determining if the called party is busy, not reachable, or does not answer; playing an unsuccessful call setup announcement; validating the digits; playing a timer announcement; validating the timer value; placing the selective call notification process in a process queue; and performing normal call setup.

In step 602, FIG. 6, the mobile telephone 118, FIG. 1, makes a call and the witch 102 determines if the call is to a mobile telephone (such as telephonic device 124) or to a PSTN telephone (such as PSTN telephonic device 113). If the call is from the caller mobile telephone 118 to the PSTN telephone 113, then normal call setup, step 604, FIG. 6, is performed. If the call is to a mobile telephone 124 or 128, FIG. 1, then the call is set up and monitored in step 606, FIG. 6.

In step 608, FIG. 6, the switch 102, FIG. 1, determines if the called party was available and answered, or if the called party was busy, not reachable, or does not answer. If the called mobile device 124 answers no further action is taken by the selective call notification process and the processing stops. Otherwise, it is determined that the caller was unable to successfully connect to the called party and the switch 102 notifies the selective call notification process of the unsuccessful call attempt.

In step 610, FIG. 6, an unsuccessful call setup announcement is played at the caller mobile telephone 118, FIG. 1, from the selective call notification process. An example of the announcement is: "The number just called is <busy/not reachable/does not answer>. Please press '#' to be informed when the called party becomes available for you to call or hang up." If the mobile telephone 118 is hung up the call is ended and processing stops.

If an entry is received from the mobile telephone 118, FIG. 1, it is verified in step 612, FIG. 6. The selective call notification process at the distributed processor 110, FIG. 1, verifies that a valid response from the mobile telephone 118 was entered. If an invalid response is detected, then the selective call notification process will replay the unsuccessful call setup announcement of step 610, FIG. 6.

In step 614, FIG. 6, playing the timer announcement from the selective call notification process at the mobile telephone 118, FIG. 1, is performed. The timer announcement may for example be: "Please enter the number of minutes within which you want to be informed". The timer value response to step 614, FIG. 6, is validated in step 616. The timer value response is verified to be within a predefined range, preferably between 5 and 720 minutes. If the timer value entered by the caller mobile telephone 118, FIG. 1, is invalid, the playing of the timer announcement of step 614, is repeated.

In step 618, FIG. 6, the selective call notification process for the called mobile is placed in the process queue. The selective call notification process places the record containing the telephonic identification code of the called mobile 124 from the preferred callers list into the process queue and the timer located in the record is updated with the entered timer value. At periodic intervals, the notify process (described in FIG. 7) running on the distributed processor 110 notifies the caller when a call can be successfully set up to the called party.

Figure 7:
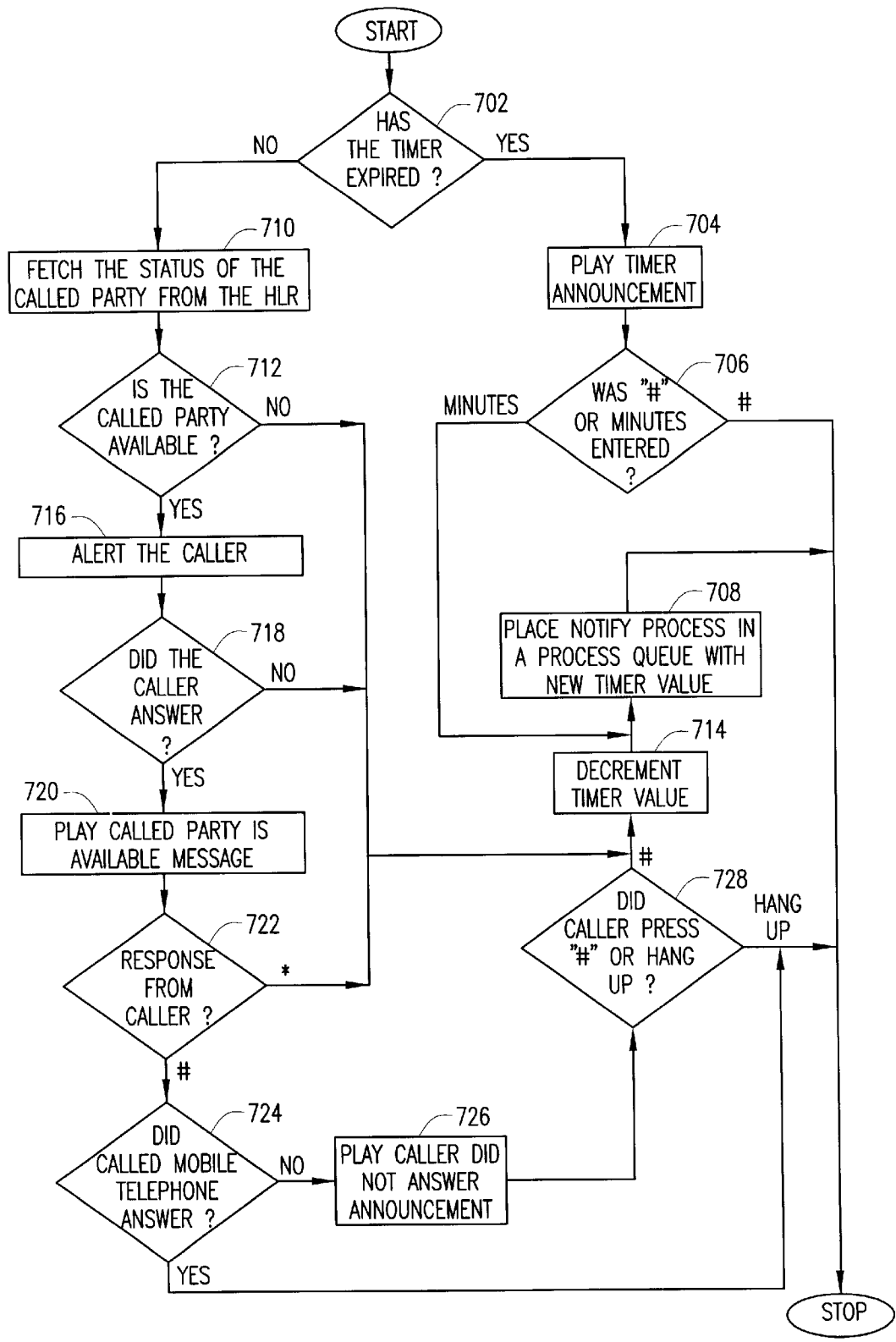
FIG. 7. is a flow chart of an alternate notify process method in accordance with an embodiment of the present invention.

Turning to FIG. 7, a flow chart for an alternate notify process method of an embodiment of the present invention is shown. The caller mobile telephone 118, FIG. 1 is associated with a preferred callers list that contains an entry for the telephone number or other telephonic identification code of the called mobile telephone 124. The selective call notification process has been started and a record for the called mobile telephone 124 has been placed in a process queue for a period determined by the timer value (see FIG. 6 above). The notify process at the distributed processor 110 monitors the availability of the called and caller mobile telephones 118, 124. When both the called and caller mobile telephones 118, 124 are available to receive calls, the notify process alerts the caller mobile telephone 118.

In step 702, FIG. 7, the notify process at the distributed processor 110, FIG. 1 checks if the timer in the preferred callers list record has expired for the called mobile telephone number or other telephonic identification. If the timer has expired, the notify process notifies the caller mobile telephone 118 associated with the preferred callers list in step 704, FIG. 7.

The expiration of the timer announcement of step 704 is played at the caller mobile telephone 118, FIG. 1, from the notify process. An example of the announcement is: "The party called is still not available for conversation. Please press '#' to drop the notify or enter the number of minutes within which you want to be informed". The response is entered by the mobile telephone 118 and received by the notify process at the distributed processor 110.

In step 706, FIG. 7, the response to the timer announcement sent by the mobile telephone 118, FIG. 1, is verified. If the mobile telephone 118 enters a '#', the record is removed from the preferred callers list and the process queue. If the response received by the notify process was valid (preferably a numerical response in the range of 5 minute to 720 minutes), then the notify process proceeds to update the appropriate record in the preferred callers list with the new timer value. In step 708, the selective call notification process places the record into the process queue with the new timer value.

If the timer has not expired in step 702, FIG. 7, then in next step is 710 fetching the status of the called mobile telephone 124, FIG. 1, from the HLR 108. The notify process at the distributed processor 110 at predetermined intervals sends a status request message to the HLR 108 containing the telephone number or other telephonic identification of mobile telephones from the preferred callers list. The HLR 108 responds to the request by sending a status report with the state of the mobile telephones associated with the previously sent telephonic identification.

In step 712, FIG. 7, the notify process at the distributed processor 110, FIG. 1, determines from the received status report if the called mobile telephone 124 is in the powered on idle state. If the reported state of the mobile telephone is either the powered off state or the powered on busy state, then the timer in the record from the preferred callers list is decremented in step 714, FIG. 7, and the record is placed into the process queue with the new timer value, step 708. If the reported status of the called mobile telephone 124, FIG. 1, is the powered on idle state, then in step 716, FIG. 7, an alert is sent by the notify process to the caller mobile telephone 118, FIG. 1, having the associated preferred callers list.

Next in step 718, FIG. 7, the notify process verifies if the caller mobile telephone 118, FIG. 1, answers the telephone in response to the alert message. If the caller mobile telephone 118 does not answer, then step 714 decrements the timer value in the preferred callers list record followed by step 708 placing the record into the process queue with the new (decremented) timer value. If the caller mobile telephone answers in step 718, then in step 720 a called party announcement is played.

The called party announcement of step 720, FIG. 7, is sent from the notify process at the distributed processor 110, FIG. 1, and announces the availability of the called mobile telephone 124 to the caller mobile telephone 118. An example of the announcement is: "The called party is now available. Press '#' to set up a call for while you hold or press '*' to continue monitoring". The notify process then waits for a response from the caller mobile telephone 118.

In step 722, FIG. 7, the response from the caller mobile telephone 118, FIG. 1, is verified. If the response from the caller mobile telephone is to continue monitoring (preferably '*'), then step 714 decrementing the timer in the preferred callers list record is performed. In step 708 placing the selective call notification process in the process queue with the new (decremented) timer value is accomplished. Otherwise, if the response is to set up a call (preferably '#') the notify process attempts to have a connection established between mobile telephones 118 and 124.

In step 724, FIG. 7, the call setup from the caller mobile telephone 118, FIG. 1, to the called mobile telephone 124 is monitored to determine if the called mobile telephone 124 answers the call. If the call is answered by the called mobile telephone 124, no further action is taken by the notify process. If the call is not answered by the called mobile telephone 124, the notify process informs the caller mobile telephone 118 that the call setup was unsuccessful, step 726.

In step 726, FIG. 7, the caller mobile telephone 118, FIG. 1, is played an announcement from the notify process about the called mobile telephone 124 not answering the call. An example of the announcement is: "The party you have called did not answer but is available. Please press '#' to retry or hang-up the telephone to delete the call data". The response to the announcement is acted on in step 728, FIG. 7.

In step 728, FIG. 7, if the response received from the caller mobile telephone 118, FIG. 1, is the caller mobile 118 hanging up the telephone, then the record in the preferred callers list is deleted and no further action is taken by the notify process. But, if the response received by the notify process from the caller mobile telephone 118 is a '#', then the timer value is decremented in step 714 followed by step 708 placing the record from the preferred callers list into the process queue with the new (decremented) timer value.

While the invention has been described and shown with reference to preferred embodiments it should be understood by those skilled in the art that various other changes in the form and details may be made without departing from the spirit and scope of the invention.

What is claimed is:

1. A method of providing information to a telephonic device about the availability of another telephonic device to receive calls in a communication system comprising the steps of:
   receiving at a distributed processor, a notification request sent from the telephonic device of the communication system;
   sending a telephonic identification request from the distributed processor to the telephonic device in response to the notification request;
   transmitting a telephonic identification code assigned to the other telephonic device from the telephonic device to the distributed processor;
   storing the telephonic identification code assigned to the other telephonic device in a preferred callers list at the distributed processor;
   determining at the distributed processor that the preferred callers list contains the telephonic identification code of the other telephonic device in response to an unsuccessful call attempt by the other telephonic device such that no connection was established between the other telephonic device and the telephonic device; and
   transmitting a caller notification to the telephonic device from the distributed processor in response to the determination that the preferred callers list contains the telephonic identification code of the other telephonic device.

2. The method of claim 1 including the steps of sending, from the distributed processor, the telephone identification code identifying the other telephonic device to a home location register, and
   sending a telephonic device report concerning availability of the other telephonic device from the home location register to the distributed processor in response to the telephone identification code being received at the home location register.

3. The method of claim 1 in which the distributed processor is a service control point.

4. A telecommunications system for providing information to a first telephonic device about the availability of a second telephonic device to receive calls, said telecommunications system comprising:
   a distributed processor connected to receive a notification request signal and a telephonic identification code assigned to the second telephonic device from the first telephonic device and transmit a caller notification signal to the first telephonic device; and
   a preferred callers list within the distributed processor configured to store the telephonic identification code assigned to the second telephonic device;
   wherein the distributed processor is configured to determine that the preferred callers list contains the telephonic identification code of the second telephonic device in response to an unsuccessful call attempt by the second telephonic device such that no connection was established between the second telephonic device and the first telephonic device and transmit the caller notification signal in response to the determination that the preferred callers list contains the telephonic identification code of the second telephonic device.

5. The system of claim 4, wherein the distributed processor is further configured to send a telephonic identification request signal to the first telephonic device in response to the notification request signal to elicit the telephonic identification code of the second telephonic device.

6. The system of claim 4, further comprising:
   a home location register connected to the distributed processor to signal the availability of the other telephonic device to the distributed processor in response to receipt of the telephonic identification code from the distributed processor.

7. The system of claim 6, wherein the receipt of the telephonic identification code at the home location register from the distributed processor is at predetermined intervals.

8. The system of claim 7, wherein the second telephonic device is an Internet Protocol (IP) telephone predetermined to be in an available state, and wherein the distributed processor is configured to send the caller notification signal to the mobile telephone when the mobile telephone is available to receive calls.

9. The system of claim 4, wherein the first telephonic device is a mobile telephone within a cellular network.

10. The system of claim 9, wherein the second telephonic device is a PSTN telephone predetermined to be in an available state, and wherein the distributed processor is configured to send the caller notification signal to the mobile telephone when the mobile telephone is available to receive calls.

11. The system of claim 4, wherein the distributed processor is further configured to set a timer associated with the telephonic identification code to run for a selectable time period entered at the first telephonic device in response to a prompt at the first telephonic device for entry of the selectable time period for continued activation of call notification.

12. The system of claim 4, further comprising:
a call notification feature at the distributed processor, the call notification feature being activated in response to receipt of the notification request signal from the first telephonic device.

13. The system of claim 4, wherein the distributed processor is a service control point.

14. The system of claim 4, wherein the distributed processor is a processor at a telephonic switch in the telecommunications system.

* * * * *

UNITED STATES PATENT AND TRADEMARK OFFICE
CERTIFICATE OF CORRECTION

PATENT NO. : 6,473,615 B1
DATED : October 29, 2002
INVENTOR(S) : Janardhan Theppasandra et al.

It is certified that error appears in the above-identified patent and that said Letters Patent is hereby corrected as shown below:

<u>Drawings,</u>
Figure 2, Reference the clock, replace "208" with -- 210 --

<u>Column 4,</u>
Line 12, replace "connected to the telephonic device" with -- connected to telephonic device --
Line 16, replace "that the telephonic devices 128 and 118" with -- that the telephonic device 118 is to be notified when both the called and calling telephonic devices 128 and 118 --

<u>Column 6,</u>
Line 25, replace "by the to cellular" with -- by the cellular --

<u>Column 11,</u>
Line 14, replace "and the witch" with -- and the switch --

<u>Column 14,</u>
Line 15, replace "register, and" with -- register; and --

Signed and Sealed this

Twenty-ninth Day of April, 2003

JAMES E. ROGAN
*Director of the United States Patent and Trademark Office*